June 10, 1969  M. H. M. MUGER  3,448,614
TURBINE MEASURER FOR METERING FLUID VOLUMES
Filed Jan. 30, 1967
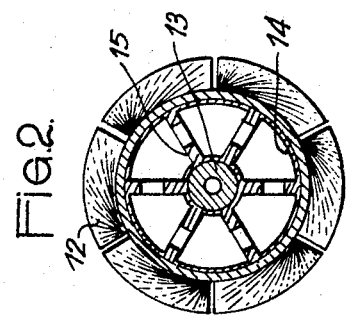
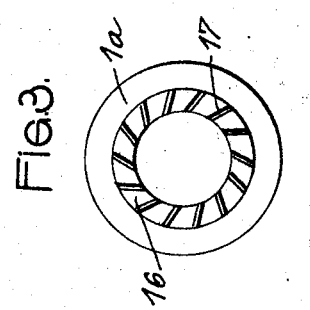
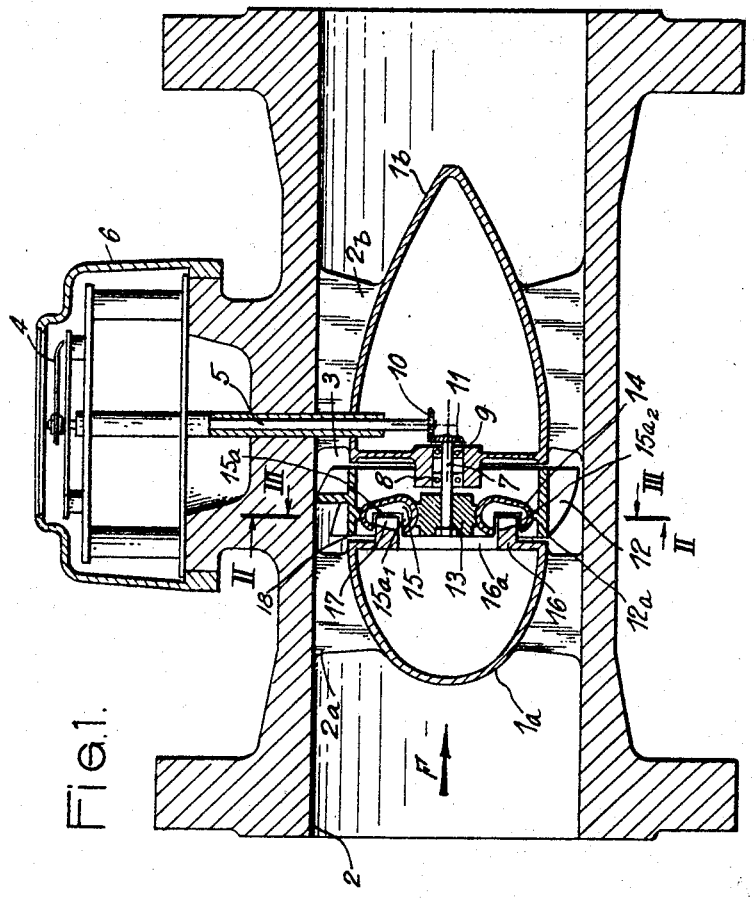

United States Patent Office 3,448,614
Patented June 10, 1969

3,448,614
TURBINE MEASURER FOR METERING
FLUID VOLUMES
Martial Henri Mathias Muger, Bagneux, France, assignor to Compagnie des Compteurs, Paris, France, a company of France
Filed Jan. 30, 1967, Ser. No. 612,372
Claims priority, application France, Feb. 21, 1966, 50,354, Patent 1,475,825
Int. Cl. G01f 1/00
U.S. Cl. 73—230                3 Claims

ABSTRACT OF THE DISCLOSURE

An axial turbine for measuring the flow of a fluid is placed in a circulation duct and drives a second turbine producing a braking torque and an axial thrust opposed to the thrust exerted on the measuring turbine by the fluid.

---

The present invention relates to improvements applied to turbine meters for metering fluid volumes, in which the flow of the fluid to be measured causes a turbine wheel to revolve around an axis parallel to the direction of the flow.

In meters of this type, dry, viscous and aerodynamic or hydrodynamic frictions are compensated by the torque resulting from the slipping of the turbine, i.e., of the divergence between its theoretical and real speed. Dry friction increase with the axial thrust set up at the same time as the torque, but, on the other hand, by virtue of Coulomb's law, it is not cancelled out at low speeds. The result of measuring is thus disturbed at high speeds by friction due to the axial thrust, and at low speeds by the dry friction of the bearings.

The invention has especially the purpose of opposing to the torque of the turbine, a fluid braking torque, the means utilized for setting up said braking torque providing on the one hand, a compensating thrust to the axial thrust, and on the other, an increased sliding permitting a more considerable fluid flow for a given speed of the turbine which thus operates with a higher Reynold's number.

It then becomes possible to effect a measurement of which it is not necessary to modify the initial rating when said meter is utilized in different temperature conditions and/or pressures, or when said meter is used with a fluid differing from that with which it had been rated.

It also becomes possible to produce a meter on which the adapting of a correcting device as a function of the temperature, pressure or volumetric mass, is justified.

In accordance with the invention, the turbine meter for metering fluid volumes utilizing an axial turbine for driving a totalizator mechanism is characterized in that it comprises a shaft connected to said totalizator mechanism and placed axially in a duct through which flows the fluid to be metered, an axial measuring turbine actuated by said fluid flowing in said duct and carried by said shaft and a second turbine connected to said shaft by which it is driven for producing a braking torque of the movement of said measuring turbine.

Other characteristics of the invention will be revealed by the description which follows and the attached drawings, which description and drawings are only given by way of example and without restrictive characters.

FIG. 1 is a longitudinal diagrammatical section of the meter according to the invention.

FIG. 2 is a section taken along the line II—II of FIG. 1.

FIG. 3 is an elevation of the upstream part of the body of the meter seen along the line III—III of FIG. 1.

FIG. 1 shows the body of the meter which comprises an upstream part 1a formed by a nose or hollow hood and a tapered downstream part 1b forming a bulb. The parts 1a and 1b are securely mounted inside a duct or piping 2, to which these parts are connected by thin side-plates 2a, 2b. The fluid to be measured flows in the piping 2 in the direction shown by the arrow F. On their peripheries, the upstream 1a and downstream 1b parts delimit, with the piping 2 and between the side-plates 2a, 2b, a crown-shaped passage 3 through which all the fluid to be measured is made to pass in the direction of the arrow F. The measuring turbine is placed in this passage 3.

A casing 6 is carried by and placed outside the piping 2, which casing 6 contains a volume totalizor device which is shown diagrammatically with a needle 4 operated by a shaft 5 traversing the piping 2 and projecting into the casing 6 as well as the interior of the downstream part 1b.

The shaft 5 is connected by tapered pinions 10 and 11 to a shaft 7 maintained by bearings 8 and 9, formed, for example, by roller (as shown in FIG. 1).

The shaft 7 forms the shaft of the measuring turbine and is consequently driven by the later. Said measuring turbine comprises peripheral blades 12 projecting in the crowned-shaped passage 3, an annular sheath 12a aligned with the peripheries of the upstream 1a and downstream 1b parts, an intermediate part 14 integral with the inner wall of the sheath 12a and forming an annular chamber provided with internal blades or paddles 15, each paddle having therein a notch 15a, and a hub 13 carrying the intermediate part 14 and fixed on the shaft 7.

In the example shown, the chamber 14 has the shape of an approximately ovoid section ring whose side turned towards the upstream part 1a is open at a height corresponding to that of the notches 15a provided in the blades or paddles 15 which are placed inside said part 14. The blades or paddles 15 are, as shown in the drawing, arranged radially.

The part 1a of the body of the meter forms, on its side directed towards the turbine, an annular part 16 projecting as far as the opening of the intermediate part 14 and delimiting a passage 16a with the interior of the nose-shaped part 1a. The part 16 is provided with a series of sloping and projecting blades or paddles 17 whose apparent contour is made to correspond as exactly as possible to the shape of the notches 15a in which notches they must, however, have free play.

The blades 15, which are rotatively driven by the turbine, are intended to cooperate with the fixed blades 17 for forming a coaxial brake turbine to the measuring or driving turbine.

FIG. 2 shows that the blades 12 of the driving turbine can be six in number and that these blades are connected to the hub 13 keyed on to the shaft 7 by the intermediate part 14 forming the paddles 15 which can also be six in number.

In FIG. 3, there is shown the part 16 integral with the upstream part 1a of the body of the meter, on which the paddles 17 are fixed, to the number of fourteen in the example shown.

It is within the scope of the invention radially to arrange the fixed paddles 17. The mobile blades 15 are then placed in a sloping position in relation to the paddles 17.

As shown, when the intermediate part 14 is rotatively driven the blades 15 are rotated with respect to the fixed blades 17. Since the inside of the nose part 1a is filled with the same fluid as that circulating into crown shaped passage 3, this fluid, of course, fills also the spaces between said rotatable blades 15 and fixed blades 17. As this is well-known in the art, the blades 15 being radially disposed constitute consequently a centrifugal turbine, and fluid along said blades is centrifugated when they rotate.

In that condition, fluid is caused to be repulsed toward the outer periphery of blades 15. Since, as described, blades 15 are enclosed in the intermediate part 14, the inside of which is of ovoid shape, and since blades 15 overlap only partially, the fixed blades 17 engaging said blades 15 only in the notch thereof, this centrifugation of the fluid takes place only in the portions of the blades 15 which are vertically aligned with fixed blades 17 (see FIG. 1). The centrifugated mass of fluid is then compelled to follow the ovoid inside of the intermediate part 14 since it cannot escape. The fluid is thus brought again at the inner periphery of rotatable blades 15 and then centrifugated anew. As explained, the fixed blades 17 are sloped and consequently the fluid centrifugated by the rotatable blades 15 is subjected to a braking effect which depends on the rotation speed of said blades 15 and, consequently, the blades 15 are themselves subjected to braking.

The advantages of the meter according to the invention are immediately apparent. The braking turbine and the measuring turbine integral with the same driving shaft respectively set up the brake torque and motor torque complying with the requirements that have been defined. The relative arrangement of the paddles 17 integral with the body of the meter and the blades 12 integral with the driving turbine, enable a braking torque to be set up of sufficiently high value that one can consider as negligible in comparison to this brake torque, the torque due to dry friction and to viscous friction. Further, as thus appears from the above explanations the inner periphery of the blades 15, i.e. the portion $15a_1$ of the notches 15a constitutes the low pressure zone of the centrifugal turbine whilst the outer periphery, i.e. the portion $15a_2$ of the notches constitutes the high pressure zone of said centrifugal turbine. Since zone $15a_1$ communicates with the inside of the nose 1a through opening 16a thus a depression is caused inside said nose and since a passage 18 necessarily exists between the nose 1a and the annular sheath 12a thus the fluid compressed by centrifugation by the blades 15 tends to escape through said passage 18. As a result the pressure in the inside of the nose 1a is lower than the outside pressure and, consequently, the intermediate part 14 tends to slide towards the nose 1a but, of course, a counterpressure is applied onto the blade 12 of the first turbine and this counter-pressure is directed along the arrow F and balances the above described action.

By means of the arrangements described, it becomes possible to produce a meter whose flow remains proportional to the angular speed of the turbine over a wide measuring extent. A meter of this kind can be utilized without modifying its initial rating, either with a fluid of different nature, or with the same fluid in variable temperature and/or pressure conditions. In this latter case, the adapting on the meter of a device correcting the measuring results as a function of the value of the variable parameter or parameters is perfectly justified.

Another advantage is that the accuracy of the meter is not affected by the wear of the bearings, this wear intervening in a slight proportion in the increase of the resistant torque.

What I claim is:
1. In a device for metering the volume of flow of a fluid medium, the combination comprising a duct through which the fluid medium is passed, a shaft located within and extending axially along said duct, a totalizer mechanism connected to said shaft so as to be driven thereby, a rotor mounted on said shaft, a first row of blades mounted on said rotor and located in the stream of fluid flow through said duct thereby establishing a driving turbine applying a driving torque to said rotor and hence to said shaft, means providing an annular chamber on said rotor, said chamber being located concentrically about said shaft and inwardly of said first row of blades and being open along one side to admit the fluid flowing through said duct, a second row of blades located within and fixed to the wall of said annular chamber and which are accordingly driven by said rotor, and a row of stationary blades extending into the open side of said annular chamber and cooperative with said second row of blades to establish a centrifugal flow of fluid within said chamber creating a braking torque on said rotor counter to said driving torque.

2. A metering device as defined in claim 1 and which further includes a hollow front nose rigidly connected to the inside wall of said duct and facing upstream of the fluid flow, a rear tapering bulb rigidly connected to the inside wall of said duct and facing downstream, said nose and bulb being aligned and separated by a space and delimiting with the wall of said duct a crown-shaped fluid passage, bearing means located at the front part of said bulb and which serve to support said shaft and rotor, and an annular sheath located in the space between said nose and bulb, said annular sheath forming part of said rotor and mounting said first row of blades for rotation in said crown-shaped passage and being located radially outward from said annular chamber.

3. A metering device as defined in claim 2 wherein said nose includes an annular part to which said row of stationary blades is affixed, said stationary blades surrounding an aperture communicating with the interior of said nose, and wherein said second row of turbine blades located within said annular chamber include notches into which said row of stationary blades extend, rotation of said second row of turbine blades in conjunction with the fluid flow created within said chamber producing a reduced pressure condition within said nose and establishing an attractive axial force on said rotor to compensate for the axial thrust in the opposite direction created by the thrust of the fluid flow on said first row of blades.

References Cited

UNITED STATES PATENTS

| 1,467,565 | 9/1923 | Blair | 73—230 |
| 1,963,904 | 6/1934 | Hodgson | 73—230 |
| 3,256,737 | 6/1966 | Sipin | 73—231 |
| 3,355,947 | 12/1967 | Karlby et al. | 73—230 |
| 3,308,661 | 3/1967 | Stevenson | 73—230 X |

CHARLES A. RUEHL, *Primary Examiner.*